United States Patent
Ortiz (10) Patent No.: US 9,331,465 B2
(45) Date of Patent: May 3, 2016

(54) AERIAL MARKER ASSEMBLIES, COMPONENTS AND RELATED METHODS

(71) Applicant: SAN DIEGO GAS & ELECTRIC COMPANY, San Diego, CA (US)

(72) Inventor: Flynn S. Ortiz, San Diego, CA (US)

(73) Assignee: San Diego Gas & Electric Company, San Diego, CA (US)

(*) Notice: Subject to any disclaimer, the term of this patent is extended or adjusted under 35 U.S.C. 154(b) by 203 days.

(21) Appl. No.: 14/213,660

(22) Filed: Mar. 14, 2014

(65) Prior Publication Data

US 2014/0283731 A1   Sep. 25, 2014

Related U.S. Application Data

(60) Provisional application No. 61/785,208, filed on Mar. 14, 2013.

(51) Int. Cl.
*H02G 7/00* (2006.01)
*H02G 7/14* (2006.01)
*H02G 7/05* (2006.01)

(52) U.S. Cl.
CPC . *H02G 7/00* (2013.01); *H02G 7/14* (2013.01); *H02G 7/053* (2013.01); *Y10T 29/49963* (2015.01)

(58) Field of Classification Search
CPC ............ H02G 7/00; H02G 7/053; H02G 7/14
USPC ......... 116/22 A, 209, DIG. 33; 174/40 R, 41, 174/45 TD; 248/61, 63, 617; 40/176, 617; 403/168
See application file for complete search history.

(56) References Cited

U.S. PATENT DOCUMENTS

| | | | | |
|---|---|---|---|---|
| 2,648,111 A | * | 8/1953 | Wengen | F16G 11/06 24/335 |
| 3,135,236 A | * | 6/1964 | Pfeiffer | H02G 7/00 116/209 |
| 3,743,762 A | * | 7/1973 | Annas | H02G 7/12 174/146 |
| 4,037,191 A | * | 7/1977 | Deane | B64F 1/18 340/331 |
| 4,474,133 A | * | 10/1984 | Anderson | H02G 7/00 116/209 |
| 4,839,567 A | * | 6/1989 | Milton | F21S 8/00 313/54 |
| 4,885,835 A | * | 12/1989 | Osgood | H02G 7/00 116/209 |
| 5,001,402 A | | 3/1991 | Milton et al. | |
| 5,208,577 A | | 5/1993 | Herzberg | |
| 5,224,440 A | * | 7/1993 | Cox | H02G 7/00 116/209 |

(Continued)

FOREIGN PATENT DOCUMENTS

| | | | | |
|---|---|---|---|---|
| CN | 103457214 A | * | 12/2013 | ............... H02G 7/00 |
| GB | 2317998 | | 4/1998 | |

(Continued)

*Primary Examiner* — R. A. Smith
(74) *Attorney, Agent, or Firm* — Klein, O'Neill & Singh, LLP (57) ABSTRACT

Aerial markers are disclosed for hanging on overhead support cables at discrete spaced apart distances to warn passersby, such as airplanes, helicopters, hang gliders, hot air balloons, and the like of the presence of the cables. The aerial markers can be made in multiple parts, having various parting lines, including a vertical parting line, and can be hung in a spaced relationship to the support cables. To space the marker body from the support wire, a support frame is used to enable hanging the marker body via one or more external clamps. Direct connection is also possible.

31 Claims, 6 Drawing Sheets

(56) References Cited

U.S. PATENT DOCUMENTS

| | | | |
|---|---|---|---|
| 5,361,018 A | 11/1994 | Milton | |
| 5,537,111 A | 7/1996 | Martin et al. | |
| 6,096,970 A * | 8/2000 | Katoh | H02G 7/053 174/40 CC |
| 7,770,533 B2 * | 8/2010 | Ramirez | A01M 29/06 116/209 |
| 8,869,732 B1 * | 10/2014 | Chervick | A01M 29/08 116/22 A |
| 2004/0194990 A1 * | 10/2004 | Brittain | H02G 7/14 174/40 CC |
| 2004/0255837 A1 * | 12/2004 | Donoho | A01M 29/06 116/22 A |
| 2007/0137883 A1 * | 6/2007 | Naidoo | H02G 7/00 174/138 F |

FOREIGN PATENT DOCUMENTS

| | | | | |
|---|---|---|---|---|
| JP | 2872082 B2 * | 3/1999 | | H02G 7/02 |
| KR | 101085165 B1 * | 11/2011 | | H02G 7/00 |

* cited by examiner

FIG. 6A

AERIAL MARKER ASSEMBLIES, COMPONENTS AND RELATED METHODS

FIELD OF ART

The present invention relates to apparatus, system, and method involving aerial marker assemblies or aerial markers for use with overhead cables and wires to indicate potential hazards for low flying aircrafts of the presence of the cables, including power lines.

BACKGROUND

Existing devices for marking the presence of transmission lines have been supported and, in the case of illuminated markers, energized from the line itself. Of these, some have been clamped to the line while others have been suspended freely from it. Sometimes the above mentioned devices have included a flashing light attached to an assembly so that the light is visible from all angles. In addition, these aircraft warning marker assemblies have employed various body shapes, including spheres and cones. Most of these were not singularly formed and have employed various methods of joining the different body sections, typically along a horizontal seam relative to the ground.

SUMMARY

Aspects of the present disclosure include an aerial marker assembly for use with an overhead cable. In an example, the aerial marker comprises a hollow marker body having at least two separately formed body sections; a parting seam where the at least two body sections are joined; a support frame attached to the marker body and having at least a portion extending externally of the marker body; and a clamp coupled to the support frame. A particular aspect of the present aerial marker assembly includes a clamp wherein the clamp comprises a hook and a body section comprising a channel having a secure tab movably fixed therein and movable towards the hook and away from the hook.

The aerial marker assembly wherein the parting seam can be mounted generally vertical relative to the ground.

The aerial marker assembly wherein the support frame has a support body and can have at least two openings formed therethrough and wherein at least two fasteners can project through the marker body and through the at least two openings on the support frame.

The aerial marker wherein the support frame can be curved to match at least part of the contour of the marker body and can have two spaced apart ends.

The aerial marker assembly wherein the secure tab is secured to the body section by a fastener projecting through a bore in the secure tab.

The aerial marker assembly wherein the support frame can comprise outwardly extending tabs extending externally of the marker body and inwardly extending tabs extending at least between the parting seam.

The aerial marker assembly wherein the first body section and the second body section can each include the same number of openings around a periphery thereof.

The aerial marker assembly can further comprise a plurality of dimples formed on an exterior surface of the marker body.

The aerial marker assembly wherein the marker body can be made from a metallic material, a composite, or a thermoplastic.

The aerial marker assembly wherein at two dimples can be formed at the parting seam so that part of each of the two dimples are formed on a first side of the parting seam and part of each of the two dimples are formed on a second side of the parting seam.

The aerial marker assembly wherein the secure tab can comprise a clamping portion comprising a first width and a block portion comprising a second width, and wherein the first width is greater than the second width.

The aerial marker assembly can further comprise a support block with a bore attached to the body section of the clamp, a block portion with a bore on the secure tab, and a threaded fastener projecting through the bore of the support block and the bore of the secure tab.

The aerial marker assembly wherein the support frame can have an enclosed circumference.

A still further feature of the present disclosure is an aerial marker body having a vertical parting seam relative to the ground where at least two separately formed body sections are joined. The aerial marker body has a plurality of dimples. The aerial marker body can have a plurality of spaced apart dimples. The aerial marker body can comprise a plurality of overlapping dimples. The aerial marker body can comprise at least two dimples that are intersected by the parting seam. The aerial marker body can have aligned bores having fasteners projecting therethrough to attach the two body sections together. The aerial marker body can have a support frame attached thereto to provide an attachment point for one or more clamps.

A yet further feature of the present disclosure is a unique clamp for use with an aerial marker body. The unique clamp can comprise a hook and a body section comprising a channel having a secure tab movably fixed therein and movable towards the hook and away from the hook. A support block with a bore can attach to the body section of the clamp, a block portion with a bore can be provided with the secure tab, and a threaded fastener projecting through the bore of the support block and the bore of the secure tab to move the secure tab towards the hook.

A still further feature of the present disclosure is an aerial marker assembly for use with an overhead cable comprising a hollow marker body made of a first material having at least two separately formed body sections; a parting seam where the at least two body sections are joined, the parting seam being vertical relative to the ground; a support frame made of a second material disposed in the parting seam and having at least a portion extending externally of the marker body; and a clamp coupled to the support frame for attaching the marker body to an overhead cable; wherein the clamp comprises a hook and a body section having a secure tab having a clamp end movable towards the hook.

The aerial marker assembly wherein the parting seam can form a continuous ring around the marker body.

The aerial marker assembly wherein the support frame can have a support body comprising at least two openings formed therethrough and wherein at least two fasteners project through the marker body and through the at least two openings on the support frame.

The aerial marker assembly wherein the support frame can be curved with two spaced apart ends.

The aerial marker assembly wherein the marker body can comprise a plurality of spaced apart dimples. The marker body can comprise a plurality of overlapping dimples. The marker body can comprise at least two dimples that are intersected by the parting seam.

The aerial marker assembly wherein the secure tab can comprise a clamping portion comprising a first width and a block portion comprising a second width, and wherein the first width is greater than the second width.

The aerial marker assembly wherein the marker body can be made from a metallic material, a composite, or a thermoplastic.

The aerial marker assembly wherein the support bracket can be made from a metallic material, a composite, or a thermoplastic.

The aerial marker assembly can further comprise a support block with a bore attached to the body section of the clamp, a block portion with a bore on the secure tab, and a threaded fastener projecting through the bore of the support block and the bore of the secure tab.

The aerial marker assembly can further comprise a gasket located between the support frame and the clamp.

The aerial marker assembly can further comprise two curved gaskets located between the hook and the secure tab.

A still further feature of the present disclosure is a method for mounting an aerial marker assembly onto an overhead cable. As disclosed, the method can comprise the steps of assembling a clamp to an aerial marker body comprising at least two separately formed body sections to form an aerial marker assembly, said assembling step comprising: attaching a support frame and the at least two body sections together by placing at least two fasteners through two sets of openings in the at least two body sections, said at least two body sections when joined define a parting seam; and attaching the clamp to the support frame, said clamp comprising a hook and a body section comprising a channel having a secure tab movably fixed therein and defining a gap with the hook, said gap being adjustable by a fastener; mounting the aerial marker assembly by placing the gap of the aerial marker assembly around an overhead cable; and turning the fastener to decrease the gap from a first gap distance to a second gap distance, which is smaller than the first gap distance.

The method wherein the parting seam of the aerial marker assembly can be generally vertical relative to the ground.

The method can further comprise placing two gaskets in between the hook and the secure tab prior to mounting the aerial marker assembly onto the overhead cable.

The method wherein a support block with a bore can be attached to the body section of the clamp, a block portion with a bore is provided with the secure tab, and the fastener projects through the bore of the support block and the bore of the secure tab.

The method wherein the marker body can comprise a plurality of spaced apart dimples.

The method wherein the marker body can comprise a plurality of overlapping dimples.

The method wherein the marker body can comprise at least two dimples that are intersected by the parting seam.

Another feature of the present disclosure is an aerial marker assembly comprising a marker body having at least two marker body sections having a support bracket secured therebetween, said support bracket comprising at least one outwardly extending tab and at least one inwardly extending tab with each tab comprising an opening and wherein the support bracket has two spaced apart ends.

A still further feature of the present disclosure is an aerial marker assembly comprising a marker body having at least two marker body sections having a support bracket secured therebetween, said support bracket comprising at least one outwardly extending tab and at least one inwardly extending tab with each tab comprising an opening and wherein the support bracket has an enclosed circumference.

A still yet further feature of the present disclosure is an aerial marker assembly comprising a marker body having at least two marker body sections having a support bracket secured therebetween, said support bracket comprising at least one outwardly extending tab and at least one inwardly extending tab with each tab comprising an opening and wherein the support bracket is attached to a clamp having an end for securing onto a cable.

Yet another feature of the present disclosure is an aerial marker assembly comprising a marker body having at least two marker body sections having a support bracket secured therebetween, said support bracket comprising at least one outwardly extending tab and at least one inwardly extending tab with each tab comprising an opening and wherein the support bracket is attached to a clamp having a slidable secure tab.

The present disclosure can also include an aerial marker assembly comprising a marker body having at least two marker body sections having a support bracket secured therebetween, said support bracket comprising at least one outwardly extending tab and at least one inwardly extending tab with each tab comprising an opening and wherein the support bracket is attached to a clamp having a pivotable secure tab.

BRIEF DESCRIPTION OF THE DRAWINGS

These and other features and advantages of the present device, system, and method will become appreciated as the same becomes better understood with reference to the specification, claims and appended drawings wherein:

DETAILED DESCRIPTION

The detailed description set forth below in connection with the appended drawings is intended as a description of the presently preferred embodiments of aerial marker assemblies provided in accordance with aspects of the present device, system, and method and is not intended to represent the only forms in which the present device, system, and method may be constructed or utilized. The description sets forth the features and the steps for constructing and using the embodiments of the present device, system, and method in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
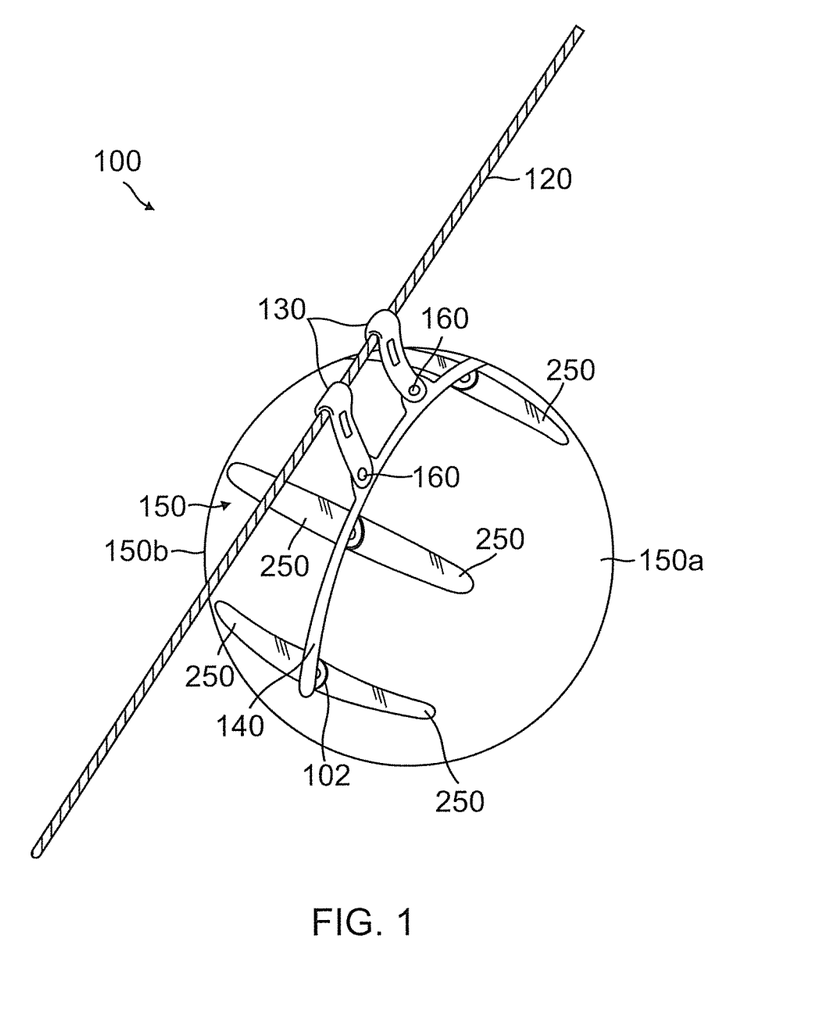
FIG. 1 is a perspective view of an aerial marker attached to a support wire.

Referring now to FIG. 1, a perspective view of an aerial marker attached to a support wire in accordance with aspects of the present device, system, and method is shown, which is generally designated 100. The aerial marker assembly 100 is suspended from a support wire 120, which is typically the highest wire along a transmission or distribution system that is also not energized. They are placed on the highest wire, in part, because that is where they will be most visible to an aircraft and to signify the lowest safe point of an array of lines. For the same reason, a marker body 150 is typically one foot in diameter or larger and more commonly about 36 inches with smaller sizes, such as 20 inches, possible for less extensive power lines or on power lines below a certain height and within a specified distance from an airport runway. More often, the aerial marker size is regulated by various governmental authorities.

The support wire 120 is placed between two consecutive electrical transmission line towers or other support structures and the line, or different sections stringed together between a series of towers, can span for miles. The markers are typically mounted at discrete spaced apart distances that are often regulated. The support cables, or sections of support wires 120, differ from a transmission lines or power line cables in at least two related aspects. Because the function of each support cable 120 is to help maintain the structural stability of two adjoining towers, the support cables differ from the power line or transmission cables in their composition. They also do not carry electrical energy. The fact they carry no electrical energy renders them safer for attaching or maintaining the aerial marker assemblies. The aerial marker assembly 100 is attached to the support wire 120 by one or more clamp assemblies 130. In the embodiment shown in FIG. 1, the aerial marker assembly 100 has two clamp assemblies 130. However, in other embodiments, the number of clamp assemblies 130 and corresponding number of attachment points 160 to attach to the marker body 150 can vary depending on the particular circumstances surrounding the installation of the aerial marker assembly 100, as further discussed below.

As shown, the marker body 150 comprises two body sections 150a, 150b that are attached together along a vertical seam 102, also referred to as a parting seam, relative to the ground. In other examples, the marker body 150 is formed from more than two body sections, such as three, four, or greater than four and their assembly defines several distinct seams. Although the two clamp assemblies 130 can be attached directly to the two body sections 150a, 150b, a support frame 140 is provided that attaches to the two body sections along the seam 102. The two clamp assemblies 130 are then attached to the support frame 140. Accordingly, application of the aerial marker assembly 100 discussed herein is understood to include single and multi-clamp assemblies 130 and multi section marker bodies.

In one exemplary embodiment, the aerial marker assembly 100 comprises a plurality of clamp assemblies 130. Shown in FIG. 1 are two clamp assemblies 130, or simply "clamp" or "clamps," with each clamp assembly 130 attached to the support frame 140 and at the other end of each clamp to the support wire 120. As is readily apparent to a person of ordinary skill in the art, the ability to attach the marker 100 quickly to the overhead support wire 120 can reduce the inherent danger of installing the maker and in performing subsequent maintenance. As the process typically involves using a helicopter with the installer hanging outside on an a platform attached to the helicopter, less time hovering above the ground and in close proximity to live wires is preferred.

Figure 3:
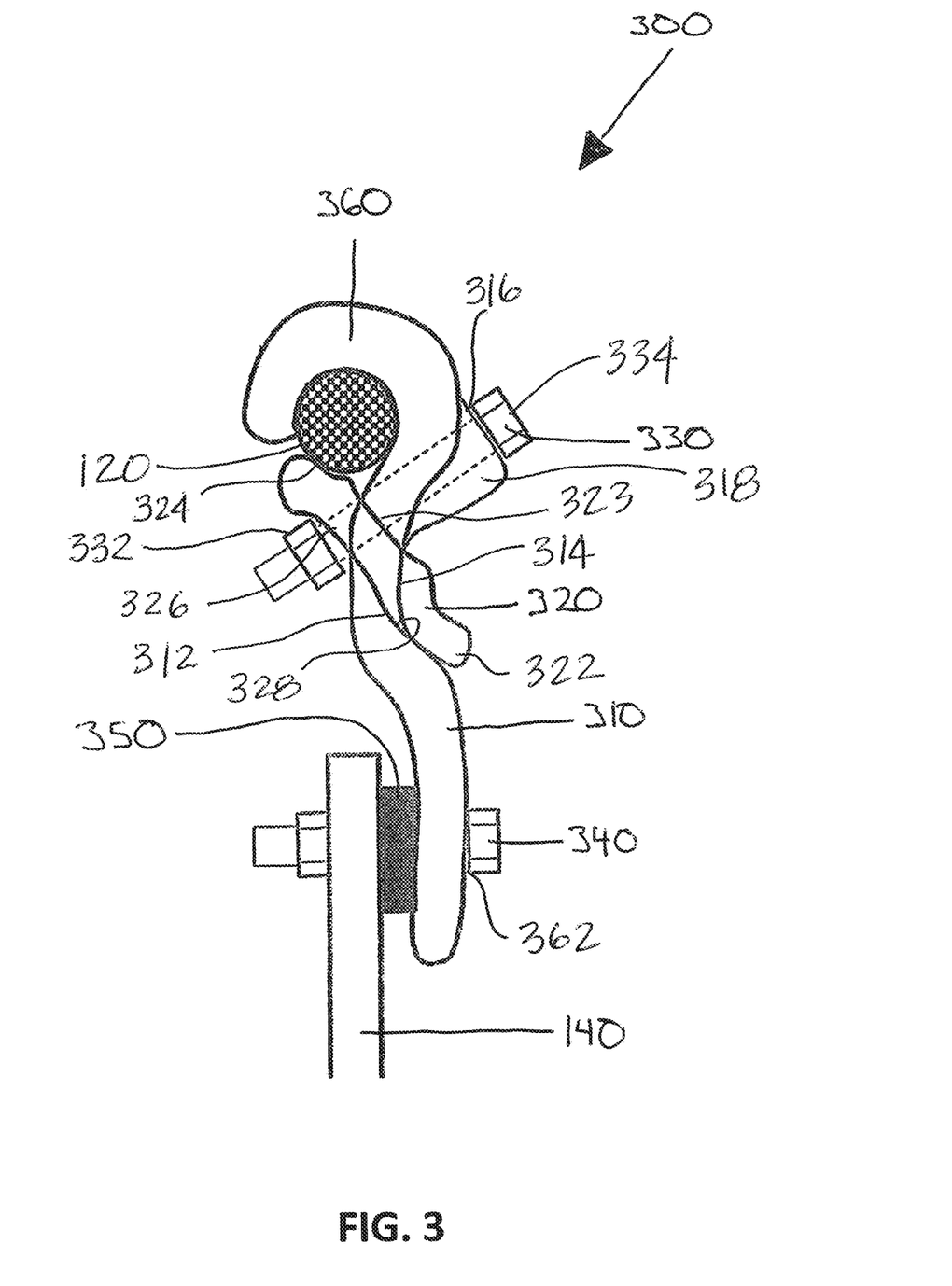
FIG. 3 is a side view of the support wire clamp.

One aspect of the present device, system, and method includes a clamp assembly 300 that attaches the aerial marker assembly 100 to a support wire 120. Referring to FIG. 3, the disclosed clamp assembly 300 in one embodiment includes a clamp body 310, a secure tab 320, and a first fastener 330 to connect the secure tab 320 to the clamp body 310. The attachment of the clamp body 310 to the support frame 140 comprises a second fastener 340 and a transition washer 350. In other examples, the support frame to clamp body attachment may be carried out using integrally formed hooks, detents, and the like to directly couple the two units together. As shown, the clamp body 310 comprises a hook 360 for wrapping around the support wire 120. The hook 360 is configured to engage the support wire 120, which can be any number of gauges or sized wires, by allowing the secure tab 320 to move to take up any slack due to the different sizes. The clamp body 310 may be constructed of any sufficiently rigid material able to retain its shape and structural integrity in the anticipated weather and wind conditions, including from a metal material, from an engineered plastic, such as PEEK, or from a composite material. The inner diameter of the hook 360 is such that it will accommodate the largest diameter support wire 120 in use.

As shown, the secure tab 320 has a generally elongated body 322 comprising a channel, through hole, or opening 323 for receiving the first fastener 330. The secure tab 320 further comprises a curved wire landing area 324 for pressing against the support wire 120, a curved anchor point 326 for abutting the nut 332, and a curved body section 328 having a similar curvature as the curved body section 312 on the clamp body 310 for fit. The secure tab 320 slides through an opening 314 in the clamp body 310 and pushes upwardly until stopped by the support wire 120. The opening 314 in the clamp body 310 allows the secure tab 320 to slide freely generally along the vertical direction relative to the ground, but limits side to side movement of the secure tab 320 within the opening 314 to a small clearance. In the embodiment shown in FIG. 3, one end of the secure tab 320, such as the curved wire landing area, engages the support wire 120 in the open portion of the hook 360. In other aspects of the present device, system, and method, a middle portion or a different section of the secure tab 320 can engage the support wire 120. For example, the secure tab 320 may be elongated and installed to the clamp body, via the first fastener 330, prior to placing the hook end 360 over the wire. This elongated body allows the secure tab 320 to slide in place within the opening 314 of the clamp body 310 rather than be installed anew onsite to reduce installation and/or maintenance time. In other examples, the secure tab 320 is pivotably attached to the clamp body 310.

To retain the secure tab 320 to the clamp body 310, the clamp assembly 300 uses a first fastener 330, as previously described. The first fastener 330 is placed into an aperture or boss 316 in the clamp body 310. The boss 316 may be formed through a shoulder section 318 on the clamp body 310. The head 334 of the fastener 330 is larger than the aperture 316 in the clamp body 310 and the interference between the head and the aperture prevents the fastener from passing clear through the clamp body 310. The first fastener 330 then passes through the opening 323 in the secure tab 320, which in one example may be a central longitudinal opening or channel. A fastener piece 332, such as a nut, is provided on the opposite end of the fastener head that is larger than the central longitudinal opening 323 in the secure tab 320. The interference between the fastener piece and the opening of the secure tab 320 prevents the secure tab 320 from falling free of the clamp assembly 300. When the first fastener 330 is loosened, it allows the secure tab 320 to move along the opening or channel 323 and through the opening 314 in the clamp body 310, away from the support wire 120. In one embodiment, the secure tab 320 is attached by a first fastener 330 comprising a nut and bolt combination. In other embodiments the first fastener may further comprise a lock washer or a standard washer, or both. In still other embodiments, the secure tab 320 may be hinged from the clamp body 310 itself, and only move around the hinge outside the clamp body 310 rather than through it.

In the embodiment shown in FIG. 3, the clamp assembly 300 engages the support wire 120 around nearly its entire circumference. The configuration allows the clamp assembly 300 to securely engage the support wire 120 even in inclement weather conditions, including high winds, in other aspects of the present device, system, and method, the inside diameter of the hook 360 and the portion of the secure tab 320 that engage the wire may be lined with a material that increases the friction between the clamp assembly 300 and the support wire 120. For example, a gasket or washer may be provided between the wire 120 and the clamping surfaces to provide a more secure fit. The surfaces of the secure tab 320 and hook 360 may also be roughened to increase friction or grip on the support wire.

In an alternate embodiment, the clamp assembly 300 may use a vice grip style configuration. For example, a set of jaws is sized to enclose, at least part of the circumference of the support wire 120. The jaws are hingedly attached at their base. A handle is hingedly attached to one jaw of the set of jaws. The handle is split longitudinally, dividing it into left and right halves. A lever is attached near the middle of the handle on one end and past the middle of the clamp body 310 opposite the jaw on the other. When the handle is moved toward the clamp body 310, the jaws close and the lever is moved over its center point. Moving the lever over its center point locks the jaws in place. As the handle locks in place, protrusion from the clamp body moves and aligns between the left and right halves of the handle. Through holes are provided through the left and right halves of the handle and the protrusion. A cotter pin is placed through the through holes to ensure the jaws remain locked into place. Thus, an aspect of the present disclosure is directed to an easy to use and fast to secure clamp assembly to clamp around a support wire. As described, the clamp assembly does not require on the spot assembly to piece the components or parts together but simply require a quick turn or simple rotation to attach to the overhead wire.

Figure 2:
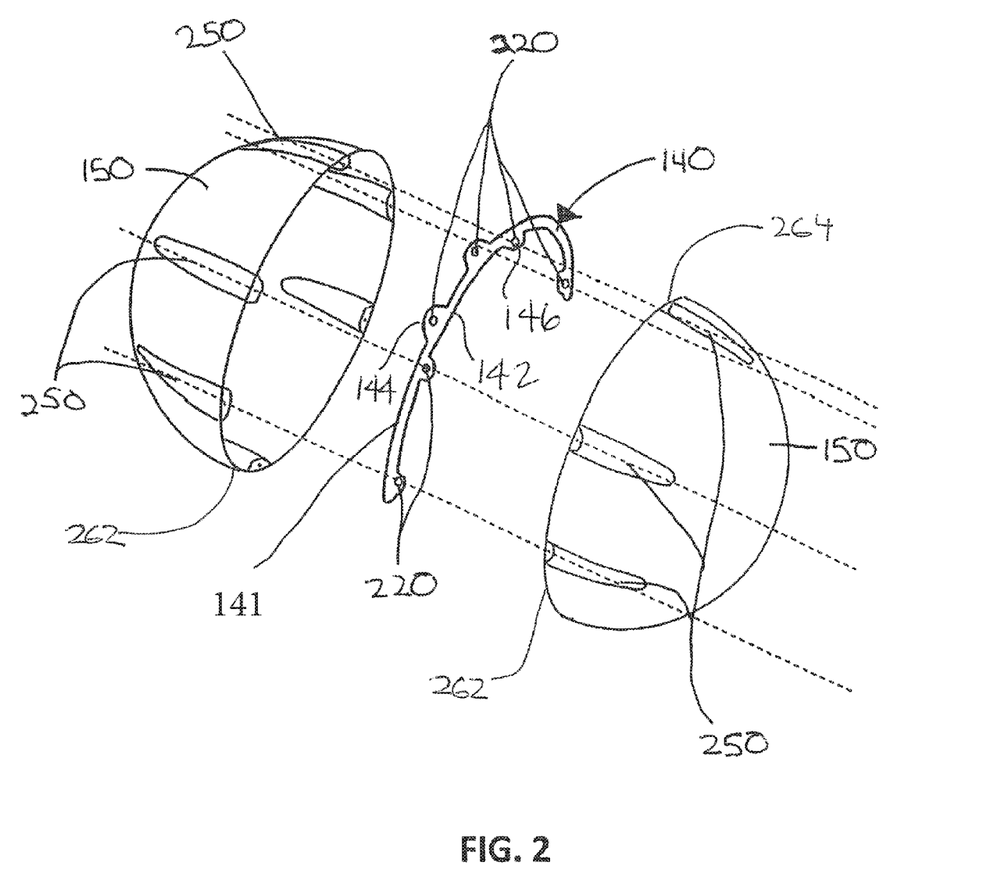
FIG. 2 is an exploded perspective view of the aerial marker of FIG. 1.

In accordance with other aspects of the present device, system, and method, a support frame 140 attaches to the clamp assemblies 300 and to the marker body 150 of the aerial marker. As shown, the support frame 140 (FIG. 2) is a central rigid structure to which the marker body and clamp assemblies attach. In various embodiments, the frame may be constructed of a metal, such as aluminum or steel, a rigid plastic, such as engineered plastic like PEEK, or a composite material, such as fiberglass or carbon fiber. One embodiment of the support frame 140 is shown in FIG. 2. The support frame 140 comprises a body 142 that resembles a partial outer contour of the two body sections 150a, 150b. The body 142 has a width and a thickness that are sized and shaped to support the body marker 150 under all adverse conditions, such as in high winds and storms. The body 142 is provided with a plurality of openings or holes 220. In one example, the number of holes 220 corresponds to the fastener attachment points for the clamp body 310 along at least a portion of the two body sections 150a, 150b. In other words, the two body sections 150a, 150b may have additional attachment holes than the holes on the support frame 140.

As shown, there are two outwardly extending tabs 144 defining two through holes 220 for attaching two clamp bodies 310, and four inwardly extending tabs 146 defining four through holes 220 for attaching the two vertically split marker body sections 150a, 150b. Other embodiments may comprise a support frame 140 configured to extend over the entire circumference of two body sections 150a, 150b. In other words, the frame body 142 may embody an enclosed perimeter. In yet another example, the support frame 140 may comprise several sections that when combined cover part or the entire circumference of the marker body sections 150a, 150b. In the embodiment shown in FIG. 2, the support frame 140 comprises a single frame leg 141 and single frame body 142.

As previously discussed, the support frame 140 and the clamps 300 connect to form an assembly. Referring again to FIGS. 1 and 3, the clamp assembly 300 comprises a second connection, on the end opposite the hook end 360, to attach the clamp body 310 to the support frame 140. The second connection comprises a second fastener 340, an opening 362 in the clamp body, an opening or through hole in the support frame 140 (FIG. 2), and a transition washer 350. In the embodiment shown in FIG. 3, the second fastener is a nut and bolt. In other embodiments, the fastener may further comprise a lock washer or a regular washer, or both. The fastener can also be a bolt and wing nut or a rivet. In the embodiment shown in FIG. 3, the transition washer 350 is made from a durable rubber compound that can withstand direct and indirect sun light for prolonged periods. In other embodiments, the transition washer may be made from a plastic, a soft elastomeric material, nylon, a paper washer, or a composite. In other embodiments, the clamp and support frame can be formed unitarily, such as welded or singularly formed, or clamped without a washer.

Figure 5:
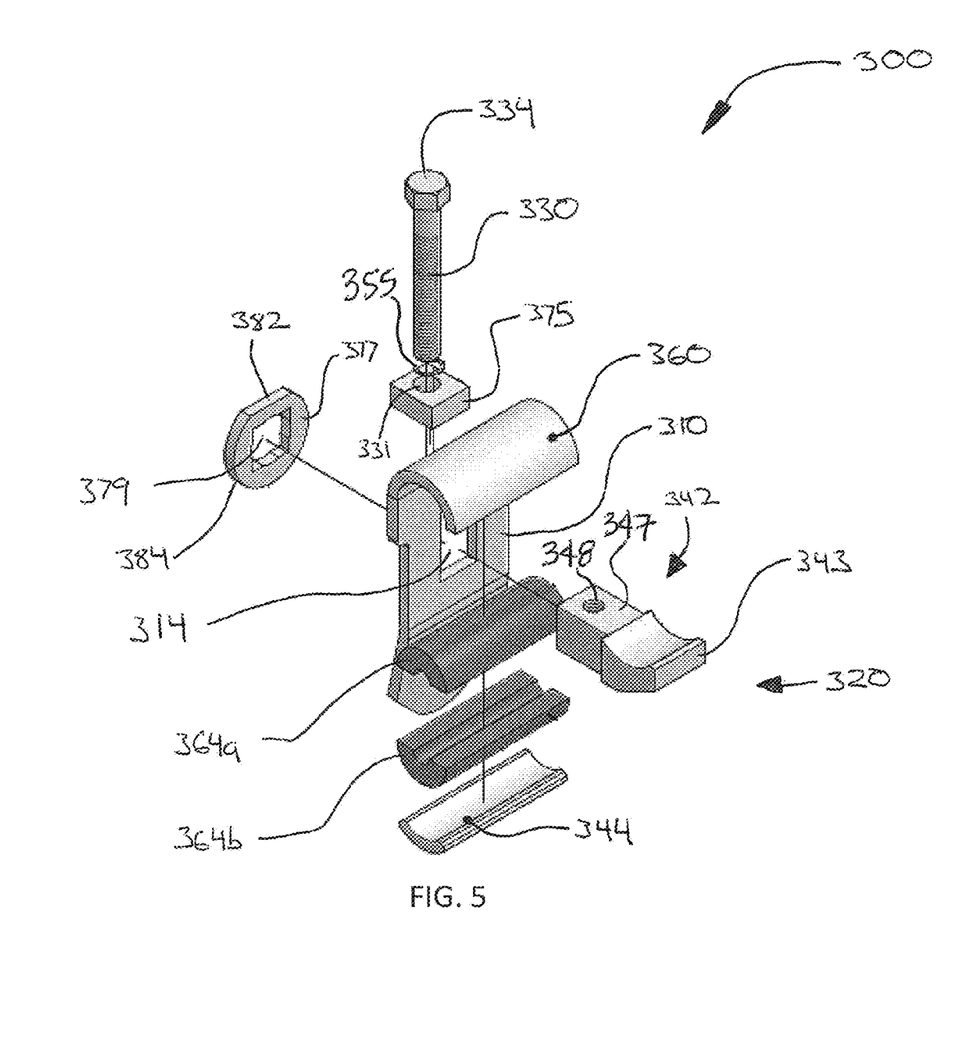
FIG. 5 shows an exploded view of an alternative clamp assembly provided in accordance with aspects of the present disclosure.
Figure 6A:
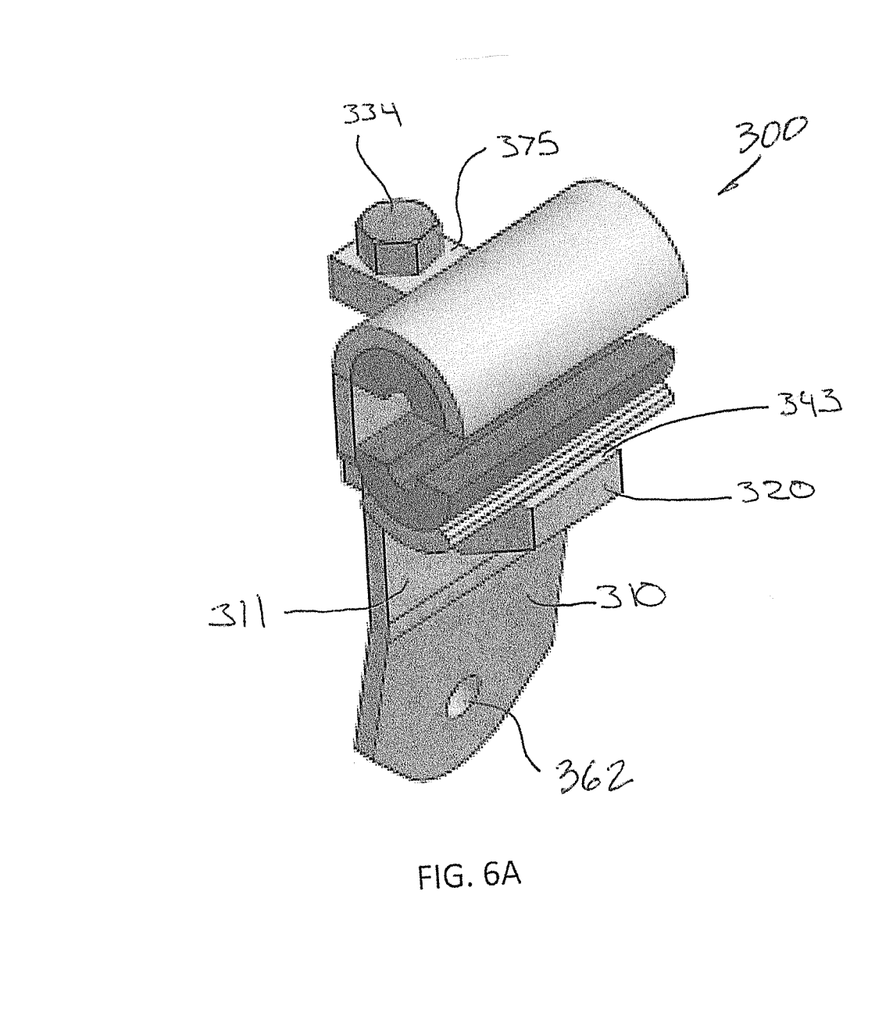
FIGS. 6A and 6B show the clamp assembly of FIG. 5 in an assembled state in two different views.
Figure 6B:
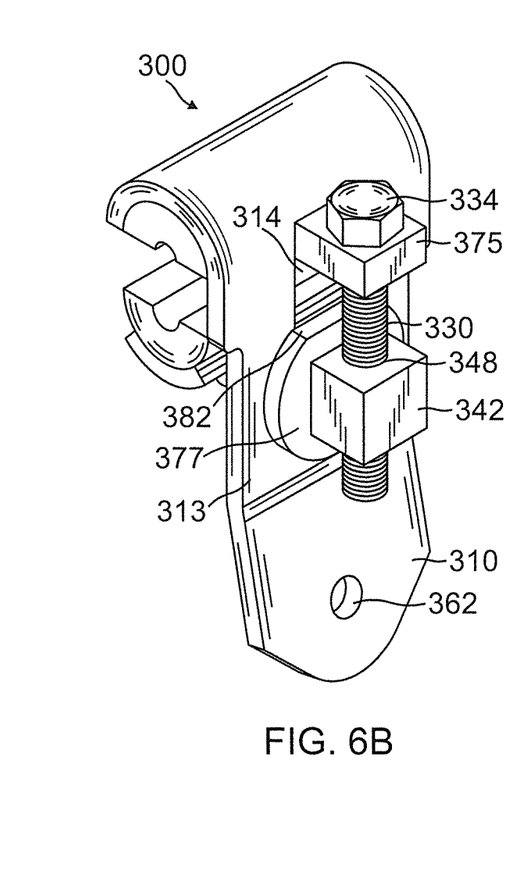

FIGS. 5, 6A and 6B show different views of an alternative clamp assembly provided in accordance with further aspects of the present disclosure. Refer initially to FIG. 5, which shows an exploded perspective view of the clamp assembly 300, a clamp body 310 is provided, which comprises a hook end 360. As shown, the hook end 360 has an arcuate surface for supporting a curved gasket or to directly contact and grip a round cable, such as an overhead support cable. A secure tab 320 is provided for use with the clamp body and comprises a body 342 and a support plate 344. In one embodiment the body 342 and support plate 344 are two separate pieces that are joined together, such as by welding, detents, threaded engagement, or a fastener. In other embodiments the body 342 and support plate 344 may be cast, forged, or machined, such as from a metal material, to form a unitary piece. The support plate 344 has an arcuate surface for receiving a matching gasket or cushion. In other examples, the arcuate surface is configured to directly contact and grip a cable or wire for hanging the aerial marker.

The body 342 of the secure tab 320 comprises a block shaped portion 347 that is sized and shaped to extend through the channel or opening 314 in the clamp body 310. A threaded bore 348 extends vertically through the block shaped portion 347 and is sized and shaped to accept a fastener 330, which may be referred to as the first fastener. The block shaped portion 347 is configured to slide in the channel 314 along a vertical direction relative to the ground to tighten the clamp assembly around a wire, as further discussed below.

The body 342 also comprises a clamping portion or clamp end 343. The clamping portion is unitarily formed with the block shaped portion 347. In other examples, the block shaped portion 347 and the clamping portion 343 are separately formed and subsequently attached to one another, such as by welding, threaded engagement, detents, or fasteners. In one example, the clamping portion 347 is wider than block shaped portion 347 and the width of the channel to prevent the secure tab 320 from sliding through the channel 314 from the orientation shown in FIG. 5. The top of the clamping portion 343 is arcuate and sized and shaped to support the support plate 344, as shown with reference to FIGS. 6A and 6B. In other examples, the support plate 344 and the clamping portion 343 are reduced to a single piece and attached to the block portion 347, either as a unitarily formed structure or as two separate structures that are secured to one another.

A support block 375, through which the first fastener 330 passes, has a bore 331, which may be threaded or unthreaded. In some embodiments, the support block 375 is formed as a separate piece (as shown in FIG. 5) and then welded or otherwise attached to the clamp body 310. In other embodiments, the support block 375 and the clamp body 342 are unitarily formed by casting, forging, or machining. A washer 355 is provided with the first fastener 330 to facilitate turning the fastener. In some examples, a lock washer or a Belleville washer is used with the first fastener 330 instead of a general flat washer to help maintain a load on the fastener upon tightening down against the secure tab 320, as further discussed below.

Another washer 377 is provided with the clamping assembly 300. As shown, the washer 377 has an opening 379 sized and shaped to receive the block portion 347 of the secure tab 320. The washer has at least one straight section 382 on the outer edge 384 thereof. The straight section 382 is sized and shaped to allow the washer to be placed against the flat undersurface of support block 375 than it would otherwise be able to if the washer 377 had an entirely round circumference. However, the various components can clearly be sized and shaped to accommodate different shaped washer, including one that has a round circumference or perimeter.

With reference now to FIGS. 4B, 5, 6A and 6B, two rubber clamping pieces 364a, 364b, which may also be referred to as gaskets, are provided for use with the support plate 344 and the hook end 360 of the clamp assembly to facilitate gripping and prevent slippage between the clamping assembly 300 and a support wire 120. A first clamping piece 364a is seated in the interior of the hook end 360 of the clamp body 310. The first clamping piece 364a may be attached via adhesive or any other method to prevent the first clamping piece 364a from separating from the clamp body 310 during normal movement or installation of the clamp assembly. The second clamping piece 364b is seat on the support plate 344. In some embodiments, the clamping pieces have an arcuate channel cut along their length in order to preform them to the support wire 120. In other embodiments, they have a flat surface which contacts the support wire 120. The clamping pieces may be made of any number of elastomeric compounds that will provide high friction and long life when squeeze around, the support wire 120. The rubber clamping pieces may be made from saturated and unsaturated rubbers, thermo plastic elastomers, acrylic rubber, butyl rubber, natural rubber, polyurethane rubber, styrene butadiene rubber, nitrile rubber, butadiene rubber, and silicone rubber, among others. In less preferred embodiments, the rubber clamping pieces 364a, 364b are omitted and the support plate 344 and the hook end 360 clamp directly onto the support wire 120.

With reference to FIGS. 5, 6A and 6B, the present clamp assembly, once assembled, is ready for use with minimal assembling to minimize operator installation time during installation of an aerial marker. As show, the first fastener 330 passes through the bore 331 of the support block 375, which may be threaded or unthreaded. The support block 375 supports the head 334 of the first fastener 330 preventing the head 334 from moving through the bore. The secure tab body 342 passes through the channel 314 in the clamp body 310. The clamping portion 343 is located on a first side 311 of the clamp body 310 following assembly. The block shaped portion 347 extends through the channel 314. The washer 377 is placed around the block shaped portion 347 of the secure tab 320 and rests against a second side 313 of the clamp body 310. The straight section 382 of the washer is placed so that it is closest to the support block 375. Also shown in FIGS. 6A and 6B is a hole 362 along a lower end of the clamp body 310 for attaching to the outwardly extending tab 144 on the support frame 140. The lower portion of the clamp body 310 can also optionally be tilted or bent relative to the upper portion of the clamp body 310 as shown to facilitate hanging or aligning the clamp assembly 300 relative to the support frame 140 and the marker body 150. The first fastener 330 threads through the bore 348 of the block portion 347 of the secure tab 320. Turning the head 334 of the first fastener 330 clockwise brings the secure tab 320 closer to the hook end 360 of the clamp body 310. This has the effect of allowing the clamp assembly 300 to clamp down on the support wire (not shown) between the two rubber clamping pieces 364a, 364b and the clamp assembly to securely hold the aerial marker (not shown) to the support wire (not shown). The clamping assembly 300 attaches to the support frame 140 via a mechanical fastener, as further discussed below with reference to FIGS. 4A and 4B.

As described, the clamp assembly 300 of FIGS. 5, 6A, and 6B provides a quick assembly feature so minimize operator service time for installing an aerial marker. With the clamp assembly 300 fully assembled as shown in FIGS. 6A and 6B, an operator simply has to slide the support cable in the gap 359 between the two rubber clamping pieces 364a 364b and then allowing the entire clamp assembly and aerial marker to rest on the support cable. The clamp assembly can now be tightened by using an appropriate socket and a hand tool, such as a cordless drill, to turn the first fastener 330. This will pull up on the secure tab 320 as the threads on the fastener 330 are turned against the threaded bore 348 on the block portion 347 of the secure tab 320. The fastener 330 is rotated until a desired grip is placed around the support cable.

Thus, an aspect of the present disclosure is understood to include a unique clamp for use with an aerial marker body. The unique clamp can comprise a hook and a body section comprising a channel having a secure tab movably fixed therein and movable towards the hook and away from the hook. A support block with a bore can attach to the body section of the clamp, a block portion with a bore can be provided with the secure tab, and a threaded fastener projecting through the bore of the support block and the bore of the secure tab to move the secure tab towards the hook. This allows the clamp to clamp a cable between the hook and the secure tab.

Another aspect of the present device, system, and method includes the support frame, the clamp and aerial marker body sections defined by a vertical split. Referring to FIG. 2 in combination with FIG. 1, the aerial marker body sections 150a, 150b are shown. In the embodiment shown in FIGS. 1 and 2, there are two aircraft aerial marker body sections 150a, 150b. In other embodiments, there can be three or more body sections. The body sections have indents 250 that allow access to the through holes 220. These indents 250 are advantages in allowing tools to come to bear on the fasteners while allowing the through holes in the support frame 140 and aerial marker body sections 150a, 150b to be conveniently assembled. The indents are generally elongated and vary in contour as it extends from the tip near the parting line and away toward the body section. As will be readily apparent to one of ordinary skill in the art, this allows the assembly to be more aerodynamic as compared to prior art designs, which included through holes in an outer rib or flange that run the entire circumference of the marker. In other words, a prior art device that includes a flange projecting outwardly of the seam, along the entire external circumference of the prior art marker body. In addition to reducing the amount of movement anticipated in the wind, the lack of an outwardly projecting flange minimizes any potential for ice formation on the aerial marker and the trapping of snow on the marker. The body sections 150a, 150b may be formed from fiberglass or a composite and may be cast from aluminum. The opening perimeter 262 of the two body sections 150a, 150b where they join to form a seam upon assembly can further include recess sections to accommodate the thickness of the support frame 140. In some embodiment, the recess section may be built into a single one of the two body sections 150a, 150b. In other embodiments, a part of the recess section may be formed in each of the two body sections 150a, 150b. If the support frame 140 has a complete circumference, then recess sections for accommodating the support frame may not be necessary since the opening perimeters 262 of the two sections can directly abut the frame.

In the embodiment shown, there are six sets of matching through holes 264 on the body sections 150a, 150b. In other embodiments, there may be two to twelve sets of through holes 264 or more. As shown in the embodiment of FIG. 2, some sets of through holes 264 are for the body sections 150a, 150b only while other through holes aligns the holes of the aerial marker body sections 150a, 150b with the through holes 220 in the support frame 140.

Another aspect of the present device, system, and method includes the support frame and aerial marker body sections defined by a vertical split. Aerial markers unfortunately are sometime targets of renegade hunters and hooligans. By having multiple aerial marker body sections, a damaged section of the marker can easily be replaced, avoiding the cost of replacing the entire unit should the marker assembly be hit with gunfire or damaged by other airborne debris. Attaching the body sections with the seams formed vertically around the circumference allows any moisture entering the assembly to drain out from the bottom. Prior art devices with horizontal seams would retain such moisture, making the assembly heavier and placing additional strain on the support wire. Thus, another aspect of the present device, system, and method include the use of one or more drain holes or passages to ensure drainage out the vertical seam 102, along the bottom of the seam. Additionally, if the marker body sections 150a, 150b clamp directly to the support wire, such as in a clam-shell configuration, any gunfire sustained by the marker body 150 may also damage the support wire itself, which cannot be detected if covered by the marker body in a clam-shell arrangement over the support wire. In other words, the section of the support wire located inside the prior art clam-shell aerial marker cannot be inspected for damage. By hanging the marker body 150 below the support wire 120 as shown in FIG. 1, any damage to the wire 120 can easily be inspected.

Additionally, in accordance with another aspect of the present invention, a method is provided for assembling a plurality of components to form an aerial marker assembly. Following assembly of the various components to form the aerial marker assembly 100, as shown in FIG. 1, the assembly 100 may be hung on an overhead cable using quick-to-install clamps. For example, the support frame 140 may be assembled with the two body sections 150a, 150b and the appropriate number of clamp assemblies 300 attached to the support frame 140 so that all that remains is to place the ends of the clamp assemblies 300 over the support wire and then securing the clamp assemblies to the support wire. This allows the disclosed marker 100 to be efficiently hung to a support wire 120 with minimal installation time.

Thus, aspects of the present device, system, and method are understood to include steps for assembling an aerial marker assembly comprising connecting aerial body sections to a support frame (FIG. 2), attaching the support frame to at least one clamp body (FIG. 3), and preparing the clamp body for attachment to a support wire (FIG. 3). A further aspect of the present invention is a provision for forming an aerial marker assembly comprising connecting at least two body sections together to a support frame having a clamp for attaching to a wire. Preferably the support frame is singularly formed but can comprise two or more assembled parts or components. The aerial marker preferably has a seam 102 that is vertical or orthogonal relative to the ground that the aerial marker is hung over.

Figure 4A:
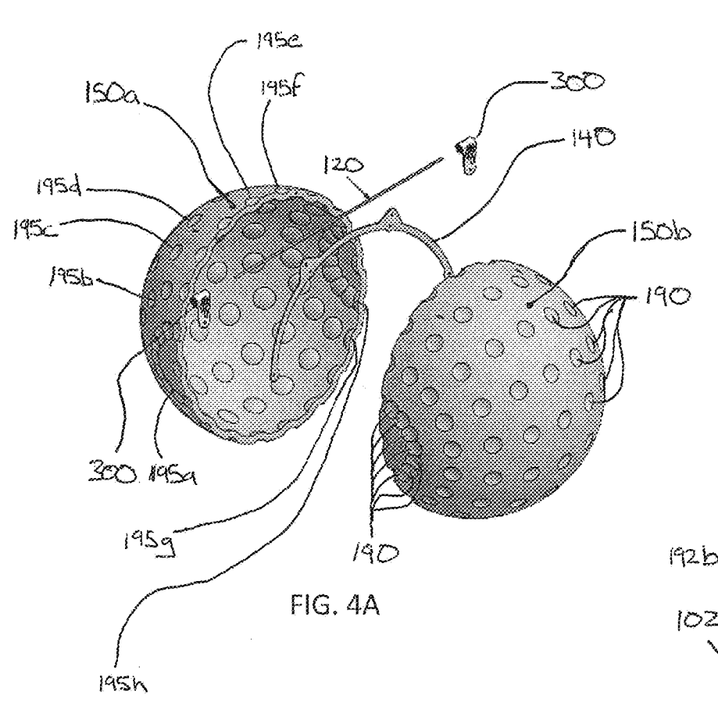
FIG. 4A shows an exploded view of an alternative aerial marker body with a support frame and two clamps and FIG. 4B show the assembly of FIG. 4A in an assembled state.
Figure 4B:
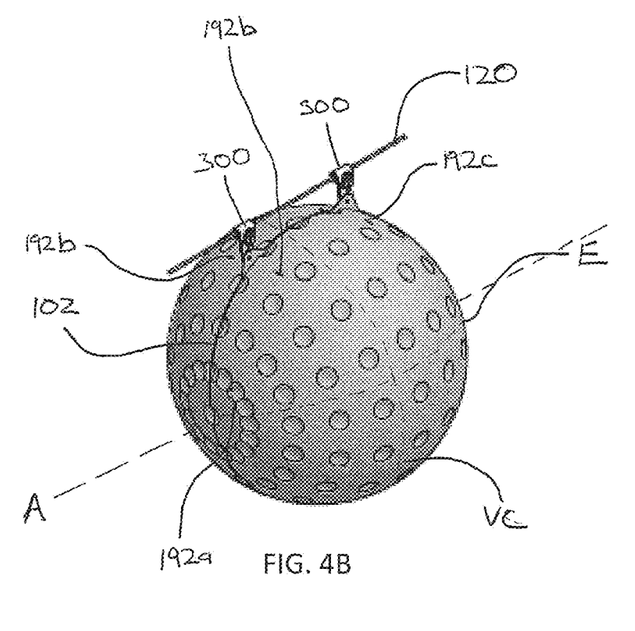

FIGS. 4A and 4B show further aspects of the present device, system, and method in an alternative embodiment that includes dimples 190 or partial spherical recesses spaced on the surface of the two body sections 150a, 150b. The dimples 190, arranged in rings or generally circular patterns 195a-h on the surface of the body 150, are more closely spaced on the area of the body halves 150a, 150b at the intersection of the parting seam 102 and the equator of the body E when assembled. In one example, in the initial ring or circular pattern 195a closer to the parting line 102, the dimples 190 overlap. The dimples 190 then extend in rings 195a-h moving toward a vertical circumference VC perpendicular to the parting seam 102. The dimples 190 are spaced farther and farther apart in each consecutive ring 195a-h as they move toward a vertical circumference VC perpendicular to the parting seam 102. The rings 195a-h contract the spacing between dimples 190 from the vertical circumference VC to a point opposite an origin O in a reversal of the arrangement just described. Additionally, in some embodiments, at least one of the dimples are split by the parting seam 102. As shown, a plurality of dimples are split by the parting line, such as from 7 or more dimples, for example 12 dimples are split by the parting line. The dimples 190 help reduce drag when wind passes over the body halves 150a, 150b. They are directionally arranged. That is, the dimples 190 and arranged in rings 195a-h such that they reduce drag most greatly along an axis A parallel to the support wire 120.

At a plurality of locations along the parting seam 102, aligned holes 192a-d are provided in the two body halves 150a, 150b to allow the body halves to join using mechanical fasteners (not shown). In one embodiment the number of holes 192a-d corresponds to locations for holes in the support frame 140. In other embodiments there are more holes 192 on the body halves 150a, 150b spaced at locations than those corresponding to the support frame 140. The body halves 150a, 150b may be connected by any mechanical fastener (not shown) that will be able to withstand the vibration and buffeting from the wind, including, for example, nuts and bolts, rivets, split pins, or threaded inserts. The assembled aerial marker comprises a plurality of dimples with a hollow spherical center and with a split line or seam. In some examples, the dimples are randomly placed around the periphery of the body halves or in different patterns than shown. Thus, an aspect of the present disclosure is understood to include an aerial marker body having a vertical parting seam relative to the ground where at least two separately formed body sections are joined. The aerial marker body has a plurality of dimples. The aerial marker body can have a plurality of spaced apart dimples. The aerial marker body can comprise a plurality of overlapping dimples. The aerial marker body can comprise at least two dimples that are intersected by the parting seam. The aerial marker body can have aligned bores having fasteners projecting therethrough to attach the two body sections together. The aerial marker body can have a support frame attached thereto to provide an attachment point for one or more clamps. The support frame can be placed between the parting seam and has a frame section extending externally of the marker body and internally of the marker body.

In a still further aspect of the present disclosure, the marker body 150 may be painted or molded with a color coat. In some examples, the color coat includes orange, white, or yellow.

A system is further provided. In one aspect of the present system, two or more aerial markers 100 of the present disclosure are hung on sections of support cables that span between a plurality of transmission, distribution, or other towers. In a specific example, an orange aerial marker 100 is hung near each end of the two ends of a cable section with said two ends each located next to or is hung to a corresponding transmission, distribution, or support tower. The spacing between two aerial markers can vary. In one example, the spacing is 60 feet from an aerial marker to a tower. In another example, the spacing is about 180 feet to about 2000 feet or more between two adjacent aerial markers 100.

Although limited embodiments of the aircraft warning marker assemblies and their components have been specifically described and illustrated herein, many modifications and variations will be apparent to those skilled in the art. For example, the various component parts may incorporate different materials, some sub-assemblies may be unitarily formed, etc. Furthermore, it is understood and contemplated that features specifically discussed for one aerial marker assembly may be adopted for inclusion with another marker assembly embodiment, provided the functions are compatible. For example, a unitary clamp and frame assembly may be used in another embodiment shown with four support frame legs. Another example includes using an alternate secure tab with the clamp assembly embodiment. Accordingly, it is to be understood that the aerial marker assemblies and their components constructed according to principles of the disclosed device, system, and method may be embodied other than as specifically described herein. The disclosure is also defined in the following claims.

What is claimed is:

1. An aerial marker assembly for use with an overhead cable comprising:
   a hollow marker body having at least two separately formed body sections;
   a parting seam where the at least two body sections are joined;
   a support frame attached to the marker body and having at least a portion extending externally of the marker body; and
   a clamp coupled to the support frame;
   wherein the clamp comprises a hook and a body section comprising a channel having a secure tab movably fixed therein and movable towards the hook and away from the hook; and wherein the secure tab is secured to the body section by a fastener projecting through a bore in the secure tab.

2. The aerial marker assembly of claim 1, wherein the parting seam is generally vertical relative to the ground.

3. The aerial marker assembly of claim 1, wherein the support frame has a support body comprising at least two openings formed therethrough and wherein at least two fasteners project through the marker body and through the at least two openings on the support frame.

4. The aerial marker assembly of claim 1, wherein the support frame is curved and has two spaced apart ends.

5. The aerial marker assembly of claim 1, wherein the first body section and the second body section each has a same number of openings around a periphery thereof.

6. The aerial marker assembly of claim 1, further comprising a plurality of dimples formed on an exterior surface of the marker body.

7. The aerial marker assembly of claim 6, wherein at least two dimples of the plurality of dimples are formed at the parting seam so that a part of each of the at least two dimples are formed on a first side of the parting seam and another part of each of the at least two dimples are formed on a second side of the parting seam.

8. The aerial marker assembly of claim 1, wherein the marker body is made from a metallic material, a composite, or a thermoplastic.

9. The aerial marker assembly of claim 1, wherein the secure tab comprises a clamping portion comprising a first width and a block portion comprising a second width, and wherein the first width is greater than the second width.

10. The aerial marker assembly of claim 1, further comprising a support block with a bore attached to the body section of the clamp, a block portion with a bore on the secure tab, and a threaded fastener projecting through the bore of the support block and the bore of the secure tab.

11. The aerial marker assembly of claim 1, wherein the support frame has an enclosed circumference.

12. An aerial marker assembly for use with an overhead cable comprising:
    a hollow marker body having at least two separately formed body sections;
    a parting seam where the at least two body sections are joined;
    a support frame attached to the marker body and having at least a portion extending externally of the marker body; and
    a clamp coupled to the support frame;
    wherein the clamp comprises a hook and a body section comprising a channel having a secure tab movably fixed therein and movable towards the hook and away from the hook; and wherein the support frame comprises outwardly extending tabs extending externally of the body and inwardly extending tabs extending at least between the parting seam.

13. An aerial marker assembly for use with an overhead cable comprising:
    a hollow marker body made of a first material having at least two separately formed body sections;
    a parting seam where the at least two body sections are joined, the parting seam being vertical relative to the ground;
    a support frame made of a second material disposed in the parting seam and having at least a portion extending externally of the marker body; and
    a clamp coupled to the support frame for attaching the marker body to an overhead cable;
    wherein the clamp comprises a hook and a body section having a secure tab having a clamp end movable towards the hook.

14. The aerial marker assembly of claim 13, wherein the parting seam forms a continuous ring around the marker body.

15. The aerial marker assembly of claim 13, wherein the support frame has a support body comprising at least two openings formed therethrough and wherein at least two fasteners project through the marker body and through the at least two openings on the support frame.

16. The aerial marker assembly of claim 13, wherein the support frame is curved and has two spaced apart ends.

17. The aerial marker assembly of claim 13, wherein the marker body further comprises a plurality of spaced apart dimples.

18. The aerial marker assembly of claim 17, wherein the marker body further comprises a plurality of overlapping dimples.

19. The aerial marker assembly of claim 18, wherein at least two dimples of the overlapping dimples and the spaced apart dimples are intersected by the parting seam.

20. The aerial marker assembly of claim 13, wherein the secure tab comprises a clamping portion comprising a first width and a block portion comprising a second width, and wherein the first width is greater than the second width.

21. The aerial marker assembly of claim 13, wherein the marker body is made from a metallic material, a composite, or a thermoplastic.

22. The aerial marker assembly of claim 13, wherein the support bracket is made from a metallic material, a composite, or a thermoplastic.

23. The aerial marker assembly of claim 13, further comprising a support block with a bore attached to the body section of the clamp, a block portion with a bore on the secure tab, and a threaded fastener projecting through the bore of the support block and the bore of the secure tab.

24. The aerial marker assembly of claim 13, further comprising a gasket located between the support frame and the clamp.

25. The aerial marker assembly of claim 13, further comprising two curved gaskets located between the hook and the secure tab.

26. A method for mounting an aerial marker assembly onto an overhead cable comprising:
    assembling a clamp to an aerial marker body comprising at least two separately formed body sections to form an aerial marker assembly, said assembling step comprising:
        attaching a support frame and the at least two body sections together by placing at least two fasteners through two sets of openings in the at least two body sections, said at least two body sections when joined define a parting seam; and
        attaching the clamp to the support frame, said clamp comprising a hook and a body section comprising a channel having a secure tab movably fixed therein and defining a gap with the hook, said gap being adjustable by a fastener;
    mounting the aerial marker assembly by placing the gap of the aerial marker assembly around an overhead cable; and
    turning the fastener to decrease the gap from a first gap distance to a second gap distance, which is smaller than the first gap distance; wherein a support block with a bore is attached to the body section of the clamp, a block portion with a bore is provided with the secure tab, and the fastener projects through the bore of the support block and the bore of the secure tab.

27. The method of claim 26, wherein the parting seam of the aerial marker assembly is generally vertical relative to the ground.

28. The method of claim 26, further comprising placing two gaskets in between the hook and the secure tab prior to mounting the aerial marker assembly onto the overhead cable.

29. The method of claim 26, wherein the marker body further comprises a plurality of spaced apart dimples.

30. The method of claim 29, wherein the marker body further comprises a plurality of overlapping dimples.

31. The method of claim 30, wherein at least two dimples of the overlapping dimples and the spaced apart dimples are intersected by the parting seam.

* * * * *